United States Patent
Ogawa et al.

(10) Patent No.: US 7,104,060 B2
(45) Date of Patent: Sep. 12, 2006

(54) EXHAUST ENERGY RECOVERY SYSTEM FOR COMBUSTION ENGINE

(75) Inventors: Masahiro Ogawa, Toyoake (JP); Yukio Shimokawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 249 days.

(21) Appl. No.: 10/279,859

(22) Filed: Oct. 25, 2002

(65) Prior Publication Data

US 2003/0084666 A1 May 8, 2003

(30) Foreign Application Priority Data

Nov. 2, 2001 (JP) ....................... 2001-337349

(51) Int. Cl.
- F02G 1/00 (2006.01)
- F02B 33/44 (2006.01)
- F01N 5/04 (2006.01)
- F01C 1/02 (2006.01)

(52) U.S. Cl. .............................. 60/597; 60/598; 60/280; 60/605.1; 418/55.2

(58) Field of Classification Search ................ 60/605.1, 60/614, 624, 287, 288, 280, 315, 597, 598, 60/623; 418/55.1, 55.2, 55.3; F01N 3/20, F01N 5/00

See application file for complete search history.

(56) References Cited

U.S. PATENT DOCUMENTS

| | | | | | |
|---|---|---|---|---|---|
| 1,583,621 | A | * | 5/1926 | Steinberg ....................... | 60/597 |
| 3,924,977 | A | * | 12/1975 | McCullough ............... | 418/55.2 |
| 4,694,654 | A | * | 9/1987 | Kawamura .................... | 60/597 |
| 4,805,409 | A | | 2/1989 | Kobayashi .................... | 60/597 |
| 5,079,913 | A | * | 1/1992 | Kishishita ...................... | 60/597 |
| 5,580,228 | A | * | 12/1996 | Ishikawa et al. ............ | 418/55.2 |
| 6,190,147 | B1 | * | 2/2001 | Kimbara et al. ............ | 418/55.3 |
| 6,434,936 | B1 | * | 8/2002 | Singh ........................... | 60/597 |
| 6,470,680 | B1 | * | 10/2002 | Janeke ......................... | 60/597 |
| 6,511,308 | B1 | * | 1/2003 | Shaffer ........................ | 418/55.2 |
| 6,651,433 | B1 | * | 11/2003 | George, Jr. ................... | 60/618 |

FOREIGN PATENT DOCUMENTS

| | | | | |
|---|---|---|---|---|
| DE | 3813735 | A1 | 11/1988 | |
| DE | 3831687 | | 3/1990 | |
| DE | 4131438 | C1 * | 12/1992 | |
| GB | 2185286 | A * | 7/1987 | ................ 60/605.1 |
| JP | A 57-000303 | | 1/1982 | |
| JP | 60-095124 | | 5/1985 | |
| JP | A 62-203916 | | 9/1987 | |
| JP | A 63-272909 | | 11/1988 | |
| JP | A 2-11815 | | 1/1990 | |
| JP | 03-13431 | | 2/1991 | |
| JP | 03-54313 | | 3/1991 | |
| JP | 03229927 | A * | 10/1991 | |
| JP | A 5-149143 | | 6/1993 | |
| JP | 05263628 | A * | 10/1993 | |
| JP | A 7-119456 | | 5/1995 | |
| JP | 07332072 | A * | 12/1995 | |
| KR | 98056732 | A * | 9/1998 | |
| WO | WO 9845589 | A1 * | 10/1998 | |

OTHER PUBLICATIONS

Japanese Office Action dated Jan. 25, 2005.
German Language Version of German Office Action for Appl. No. 102 50 838.0–13, issued Jan. 9, 2006.
English Tanslation of German Office Action for Appl. No. 102 50 838.0–13, issued Jan. 9, 2006.

* cited by examiner

*Primary Examiner*—Thai-Ba Trieu
(74) *Attorney, Agent, or Firm*—Kenyon & Kenyon LLP

(57) ABSTRACT

An exhaust energy recovery system for a combustion engine having an exhaust passage has a displacement expansion device and a generator. The expansion device is located in the exhaust passage. Exhaust gas is introduced into the expansion device. The expansion device has an expansion chamber the volume of which varies in accordance with the pressure of exhaust gas and generates power in accordance with the volume variation of the expansion chamber. The generator generates electricity in accordance with the power generated by the expansion device. This efficiently recovers exhaust gas and effectively uses the recovered exhaust gas.

15 Claims, 10 Drawing Sheets

Fig. 8
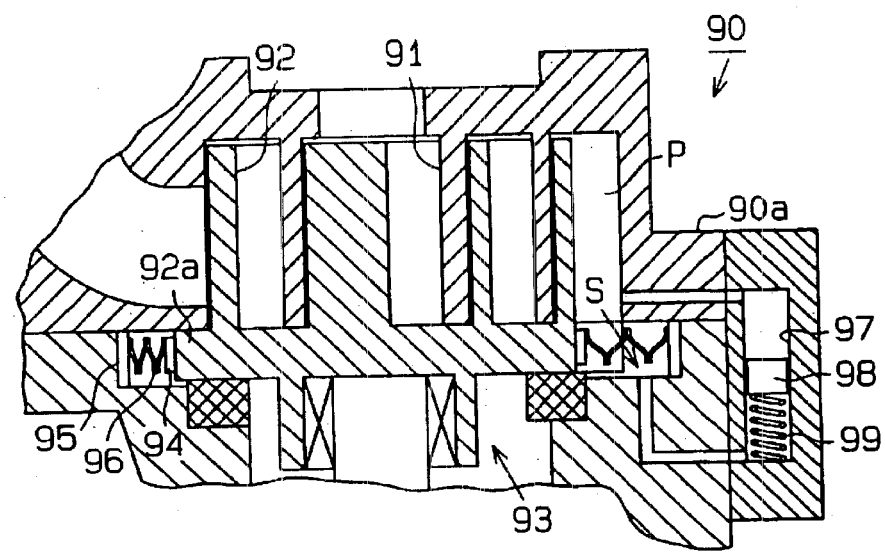
Fig. 9(a)          Fig. 9(b)
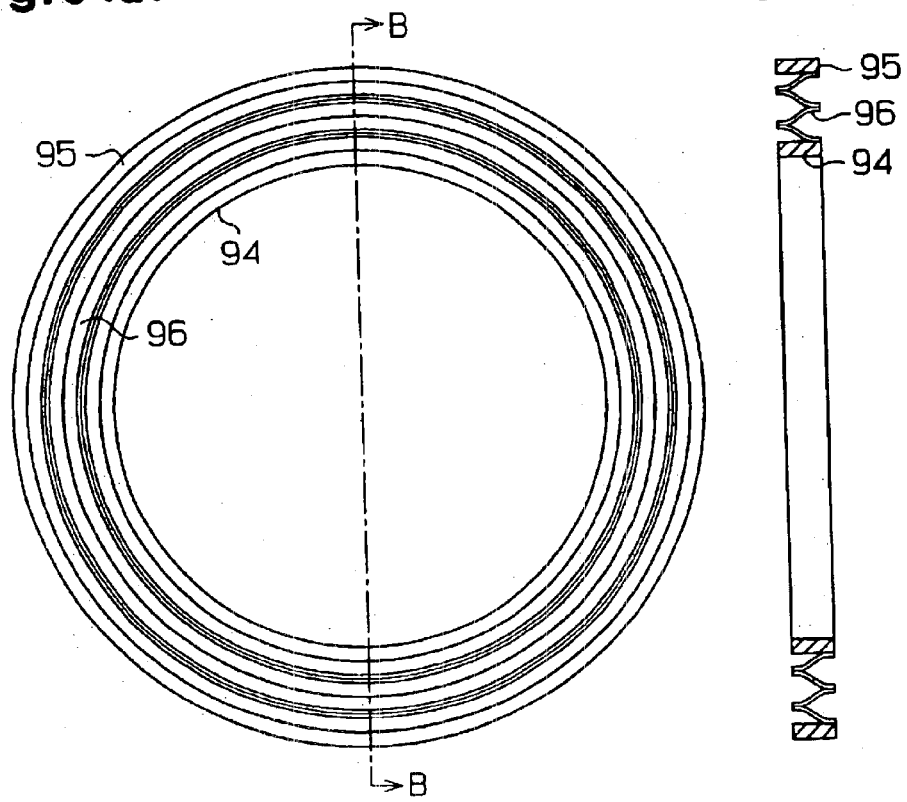

EXHAUST ENERGY RECOVERY SYSTEM FOR COMBUSTION ENGINE

BACKGROUND OF THE INVENTION

The present invention relates to an exhaust energy recovery system for a combustion engine that recovers and recycles the energy of exhaust gas (exhaust energy).

Japanese Laid-Open Patent Publication No. 3-54313 discloses such exhaust energy recovery system for a combustion engine. The recovery system includes a vane type displacement expansion device in an exhaust passage of the combustion engine. The output shaft of the expansion device is mechanically coupled to and driven by a crankshaft of the engine. The output shaft of the expansion device is rotated by the exhaust energy, and the rotation of the output shaft is transmitted to the crankshaft. Thus, the exhaust energy is recovered to assist the engine output.

However, in the above exhaust energy recovery system, the output shaft of the displacement expansion device and the crankshaft are mechanically coupled to each other. Therefore, the rotational speed of the displacement expansion device is determined in accordance with the rotational speed of the engine regardless of the flow rate of exhaust gas introduced into the displacement expansion device. Therefore, depending on the driving condition of the engine, the exhaust energy is not sufficiently recovered. Further, the system can cause the load of the engine to increase or the back pressure to increase.

Furthermore, since the exhaust energy is recovered by mechanical means, the recovered exhaust energy is only used for assisting the engine output. This extremely limits the flexibility of the recycling of the recovered exhaust energy.

SUMMARY OF THE INVENTION

Accordingly, it is an objective of the present invention to provide an exhaust energy recovery system for a combustion engine that efficiently recovers exhaust gas and effectively uses the recovered exhaust gas.

To achieve the above objective, the present invention provides an exhaust energy recovery system for a combustion engine having an exhaust passage. The exhaust energy recovery system includes a displacement expansion device and a generator. The displacement expansion device is located in the exhaust passage. Exhaust gas is introduced into the expansion device. The expansion device has an expansion chamber the volume of which varies in accordance with the pressure of exhaust gas and generates power in accordance with the volume variation of the expansion chamber. The generator generates electricity in accordance with the power generated by the expansion device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is an enlarged partial cross-sectional view illustrating a scroll expansion device according to a fourth embodiment;

FIG. 9(a) is a plan view illustrating a sealing of the scroll expansion device according to the fourth embodiment;

FIG. 9(b) is a cross-sectional view illustrating the sealing;

DETAILED DESCRIPTION OF THE PREFERRED EMBODIMENTS

A first embodiment of the present invention will now be described with reference to FIGS. 1 to 3.

Figure 1:
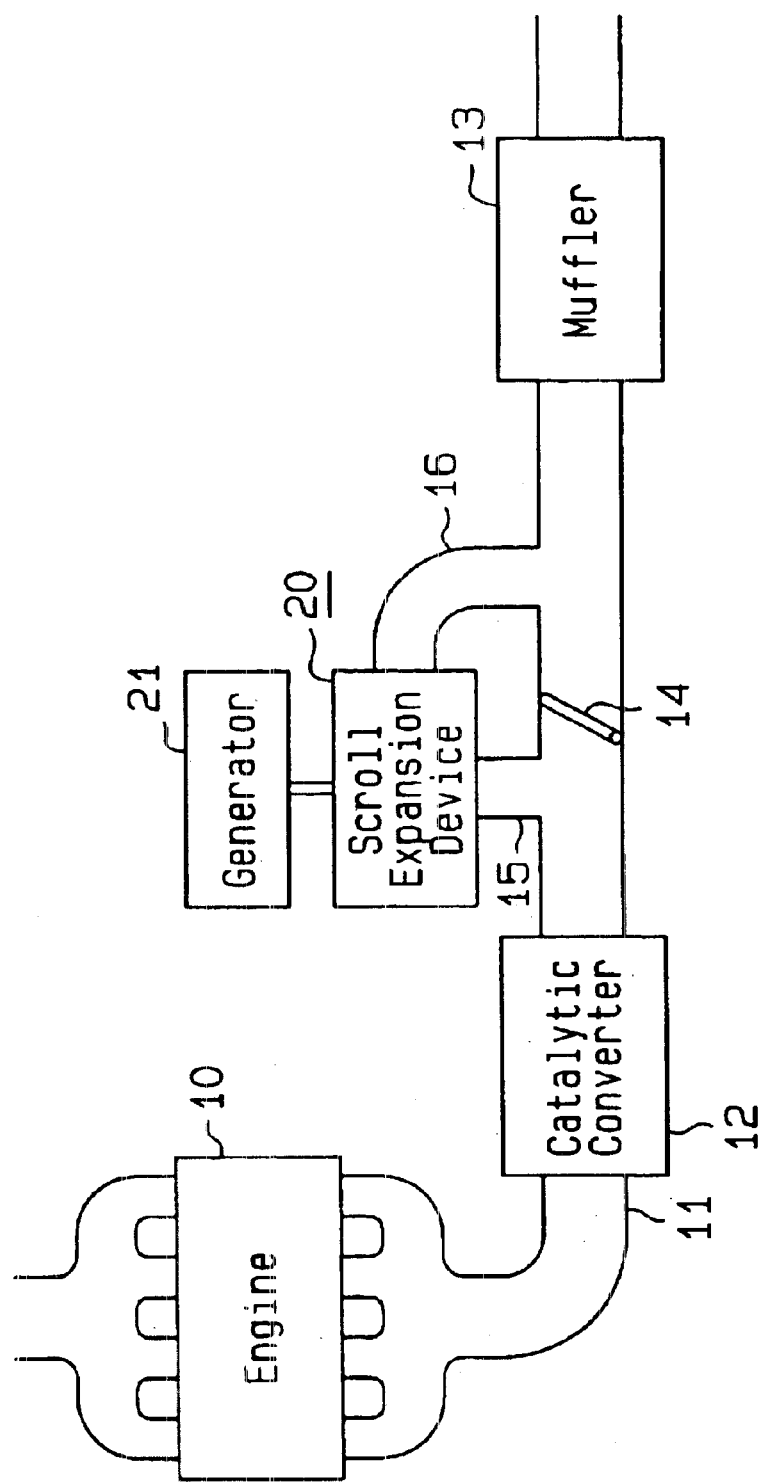
FIG. 1 is a schematic view illustrating the entire structure of a first embodiment of the present invention.

FIG. 1 shows an exhaust energy recovery system according to the first embodiment of the present invention.

As shown in FIG. 1, a combustion engine 10 mounted on a vehicle has an exhaust passage 11. A catalytic converter 12 and a muffler 13 are located in the exhaust passage 11. The exhaust energy recovery system according to the first embodiment includes a scroll type displacement expansion device (hereinafter, simply referred to as a scroll expansion device) 20 and a generator 21. The scroll expansion device 20 generates output using exhaust gas flowing through the exhaust passage 11. The generator 21 generates power from the output of the scroll expansion device 20.

A relief valve 14 is located downstream of the catalytic converter 12 in the exhaust passage 11. A suction port 15 is connected to the exhaust passage 11 upstream of the relief valve 14. The suction port 15 introduces exhaust gas into the scroll expansion device 20. An exhaust port 16 is connected to the exhaust passage 11 downstream of the relief valve 14. The exhaust port 16 exhausts gas from the scroll expansion device 20.

The relief valve 14 is a closed-type pressure-regulating valve. When the relief valve 14 is closed, exhaust gas is prevented from flowing between the suction port 15 and the exhaust port 16. At this time, exhaust gas that flowed through the catalytic converter 12 is sent to the scroll expansion device 20 through the suction port 15. After flowing through the scroll expansion device 20, exhaust gas is returned to the exhaust passage 11 through the exhaust port 16. Exhaust gas is then released to the atmospheric air through the muffler 13.

When the pressure of exhaust gas located upstream of the relief valve 14 increases to a value greater than or equal to a predetermined value, the relief valve 14 opens to permit exhaust gas to flow between the suction port 15 and the exhaust port 16 in the exhaust passage 11. This permits exhaust gas to flow without passing through the scroll expansion device 20. As a result, exhaust gas is prevented from flowing to the scroll expansion device 20 excessively.

The structure of the scroll expansion device 20 will now be described with reference to FIGS. 2 and 3.

Figure 2:
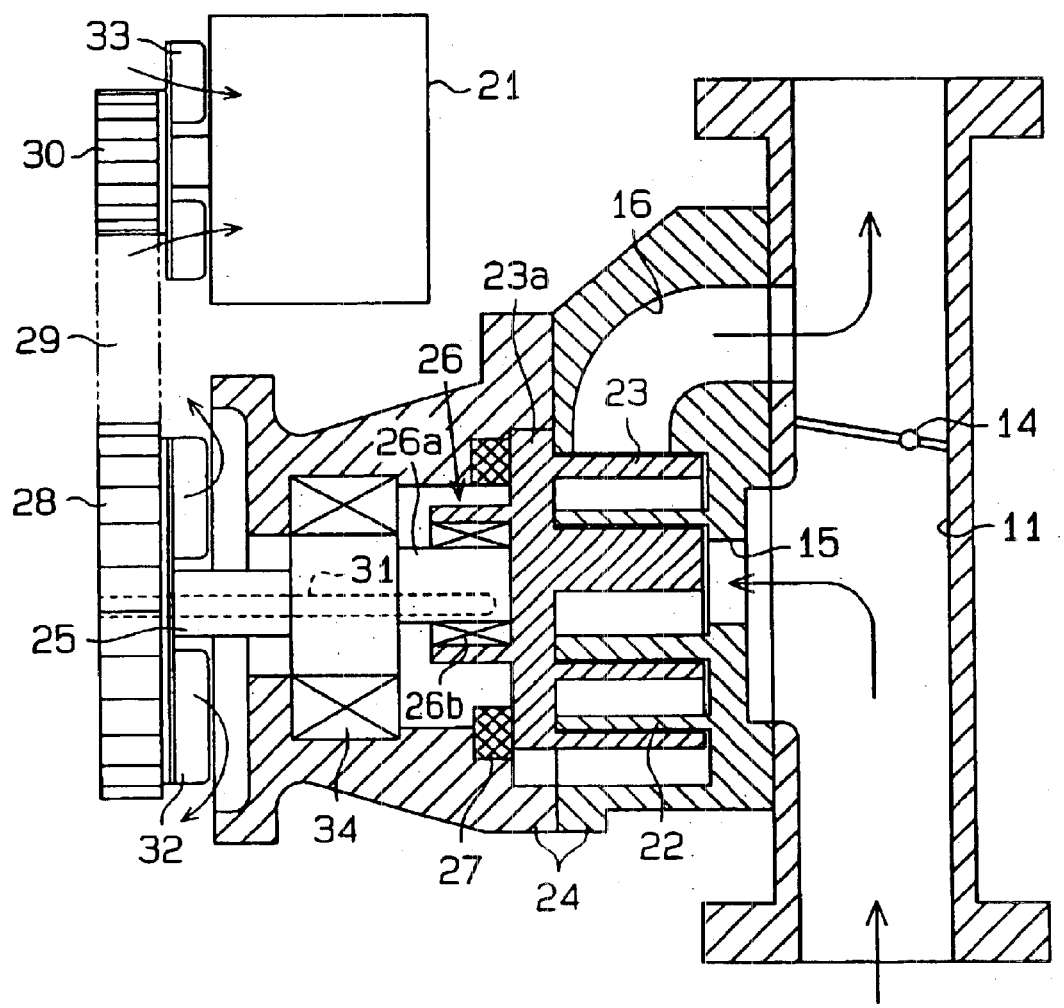
FIG. 2 is a cross-sectional side view illustrating a scroll expansion device according to the first embodiment.

As shown in FIG. 2, the scroll expansion device 20 includes a fixed scroll 22 and a movable scroll 23.

The fixed scroll 22 is secured to a case 24 of the scroll expansion device 20. A suction port 15 is formed in the vicinity of the center of the fixed scroll 22. An exhaust port 16 is formed radially outward of the suction port 15.

The movable scroll 23 is secured to a substantially disk-shaped base plate 23a and is located to face the fixed scroll 22.

An output shaft 25 is rotatably supported by the case 24 with a radial bearing 34. The output shaft 25 is coupled with the base plate 23a of the movable scroll 23 by a crank mechanism 26. The crank mechanism 26 includes an eccentric shaft 26a and a needle bearing 26b. The eccentric shaft 26a is located at a position offset from the center of the output shaft 25. The needle bearing 26b couples the eccentric shaft 26a with the movable scroll 23 such that the eccentric shaft 26a rotates relative to the movable scroll 23. The movable scroll 23 and the base plate 23a orbit about the axis of the output shaft 25. Rotation of the movable scroll 23 and the base plate 23a is converted to rotation of the output shaft 25 by the crank mechanism 26.

Further, an anti-rotation mechanism 27 is located between the base plate 23a of the movable scroll 23 and the case 24. The anti-rotation mechanism 27 prevents the movable scroll 23 and the base plate 23a from rotating.

The output shaft 25 is connected to a first pulley 28 as shown in FIG. 2. The first pulley 28 is operably coupled to a second pulley 30 of the generator 21 by a belt 29.

Figure 3:
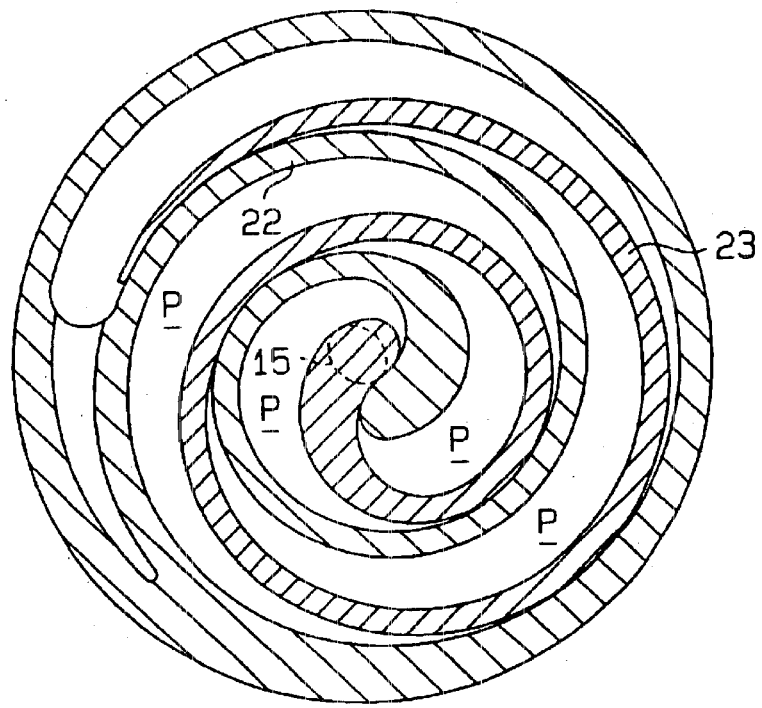
FIG. 3 is a cross-sectional view illustrating a scroll portion of the scroll expansion device.

As shown in FIG. 3, expansion chambers P are defined between the volute portions of the fixed scroll 22 and the movable scroll 23. When the movable scroll 23 orbits in a predetermined direction (counter-clockwise as viewed in FIG. 3), the expansion chambers P orbit and move radially outward of the scrolls 22, 23. Accordingly, the volume of each expansion chamber P increases.

When exhaust gas is introduced into the scroll expansion device 20 from the suction port 15, the exhaust gas pivots between the scrolls 22, 23 and moves radially outward from the center of the scrolls 22, 23. The exhaust gas that has reached the peripheral portion of the scrolls 22, 23 is exhausted from the exhaust port 16. Movement of exhaust gas in the expansion device 20 causes the movable scroll 23 to pivot, which rotates the output shaft 25. The rotation of the output shaft 25 is transmitted to the generator 21 by the first and second pulleys 28, 30 and the belt 29. Thus, the generator 21 is activated and generates power. The power is stored in a battery, which is not shown, or supplied to electrical equipment of the vehicle.

When the scroll expansion device 20 is operating, components are heated by the exhaust gas. If the radial bearing 34 or the needle bearing 26b is heated, lubrication can deteriorate. Also, coils in the generator 21 can be heated. The first embodiment employs the following cooling structure.

As shown in FIG. 2, a heat pipe 31 is located in the output shaft 25 and the eccentric shaft 26a. Heat of the bearings 34, 26b is transferred toward the first pulley 28. The heat pipe 31 is preferably located close to the axis of the output shaft 25 to prevent the centrifugal force of the output shaft 25 from increasing.

Further, fins 32, 33 are located on the first and second pulleys 28, 30, respectively. The fin 32 generates cooling air in the vicinity of the first pulley 28 as the first pulley 28 is rotated. The fin 33 sends cooling air into the generator 21 as the second pulley 30 is rotated.

The fixed scroll 22 and the movable scroll 23 of the scroll expansion device 20 have volute portions. This complicates the manufacturing process. Therefore, the volute portions and base plates may be formed separately and secured to one another afterwards. This facilitates the manufacturing process. For example, a groove is formed on each base plate corresponding to a portion to be joined with the associated volute portion. Each volute portion, which is formed separately, is then attached to the corresponding groove and secured by vacuum brazing or the like. Finish machining such as grinding is performed as required.

The first embodiment provides the following advantages.

(1) In the first embodiment, the scroll expansion device 20 is located in the exhaust passage 11 to generate power in accordance with the change in the volume of the expansion chambers P by the pressure of exhaust gas. Further, the generator 21 is provided to generate electricity by the power exerted by the scroll expansion device 20. Therefore, exhaust energy is efficiently recovered and utilized.

(2) In the first embodiment, the scroll expansion device 20 is located downstream of the catalytic converter 12 in the exhaust passage 11. Therefore, although the temperature of exhaust gas decreases when expanded in the scroll expansion device 20, the temperature of exhaust gas that flows through the catalytic converter 12 is kept high. This easily maintains the activation temperature of the catalyst.

(3) If the exhaust pressure is abnormally high, the relief valve 14 permits exhaust gas to flow without passing through the scroll expansion device 20. Therefore, the scroll expansion device 20 is protected when the exhaust pressure abnormally increases due to, for example, backfire.

(4) The expansion chambers P defined in the scroll expansion device 20 reduce sound wave that is passed on through exhaust gas. Therefore, the scroll expansion device 20 decreases the exhaust sound. Utilizing the scroll expansion device 20 as a noise eliminator reduces the load on the muffler 13. Thus, the structure of the muffler 13 may be simplified or the muffler 13 may be eliminated. As a result, the pressure loss in the exhaust system is reduced.

(5) The heat pipe 31 is located in the output shaft 25 and the eccentric shaft 26a of the scroll expansion device 20 to move the heat of the bearings 34, 26b toward the first pulley 28. This increases the cooling performance in the scroll expansion device 20 to which exhaust gas having high temperature is introduced.

(6) The fin 32 is located on the first pulley 28 of the output shaft 25. The fin 32 generates cooling air in accordance with the rotation of the first pulley 28. This further improves the cooling performance in the scroll expansion device 20.

(7) The fin 33 is located on the second pulley 30 of the generator 21. The fin 33 sends cooling air into the generator 21 in accordance with the rotation of the second pulley 30. This efficiently cools the coils in the generator 21.

It should be apparent to those skilled in the art that the present invention may be embodied in many other specific forms without departing from the spirit or scope of the invention. Particularly, it should be understood that the invention may be embodied in the following forms.

The cooling structure, which includes the heat pipe 31, and the fins 32, 33, need not be provided. Only a part of the cooling structure may be applied or the entire cooling structure may be eliminated.

In the first embodiment, the relief valve 14 permits exhaust gas to flow without passing through the scroll expansion device 20 when the exhaust pressure is abnormally high. However, the relief valve 14 may be eliminated or other components having the similar function as the relief valve 14 may be employed.

In the first embodiment, the relief valve 14 closes the exhaust passage 11. The suction port 15 is connected upstream of the relief valve 14 and the exhaust port 16 is connected downstream of the relief valve 14 to introduce exhaust gas into the scroll expansion device 20. However, for example, the suction and exhaust ports 15, 16 may be eliminated and the scroll expansion device 20 may be located in the exhaust passage 11.

The power transmission between the scroll expansion device 20 and the generator 21 may be performed by other power transmission mechanism than the belt and the pulley. For example, the generator 21 may be directly connected to the output shaft 25 or gears may be used.

The scroll expansion device 20 need not be located downstream of the catalytic converter 12 but may be located at any position in the exhaust passage 11.

A vane type or reciprocating piston type displacement expansion device may be applied instead of the scroll type displacement expansion device.

A second embodiment of the present invention will now be described. The differences from the first embodiment will mainly be discussed below, and like members are given the like numbers and detailed explanations are omitted.

Figure 4:
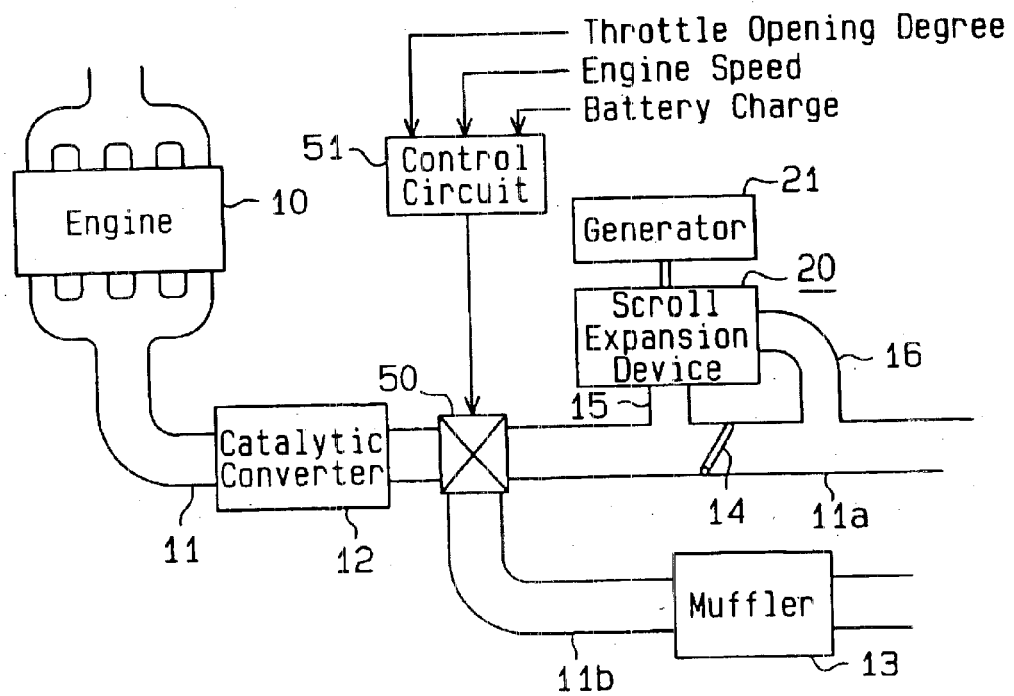
FIG. 4 is a schematic view illustrating the entire structure of a second embodiment of the present invention.

As shown in FIG. 4, the exhaust passage 11 is branched to a first branch 11a and a second branch 11b at a portion downstream of the catalytic converter 12. The scroll expansion device 20 is located in the first branch 11a and the muffler 13 is located in the second branch 11b.

A flow control valve 50, or a pressure-regulating valve, is located at the branching portion of the exhaust passage 11. The flow control valve 50 is controlled by a control circuit 51 to adjust the flow rate of exhaust gas to the first and second branches 11a, 11b. The control circuit 51 receives the driving condition of the engine 10, such as the throttle opening degree and the engine speed, and the information, such as the battery charge. The control circuit 51 controls the flow control valve 50 in accordance with the received information. The structure allows controlling the flow rate of exhaust gas introduced into the scroll expansion device 20.

The flow control valve 50 controls the flow rate as described below.

When the flow rate of exhaust gas to the scroll expansion device 20 increases, the rotational speed of the expansion device 20 increases. This also increases the pressure loss in the expansion device 20, which causes the back pressure to increase. Therefore, the flow control valve 50 is controlled to adjust the flow rate of exhaust gas introduced into the scroll expansion device 20 by permitting the exhaust gas to flow through the second branch 11b, in which the muffler 13 is located, when the flow rate of exhaust gas from the engine 10 is great. This suppresses the increase of back pressure caused by the pressure loss in the scroll expansion device 20. This also prevents the scroll expansion device 20 from rotating excessively.

When the flow rate of exhaust gas from the engine 10 is sufficient, the flow control valve 50 may be controlled to supply exhaust gas to the expansion device 20 such that the driving efficiency of the scroll expansion device 20 is optimized.

Further, if it is determined that the electricity need not be generated based on the information such as the battery charge and the electrical load of the vehicle, the flow control valve 50 is controlled to reduce or stop the flow rate of exhaust gas introduced into the scroll expansion device 20. In this case, the amount of electricity generated by the generator 21 is adjusted in accordance with the demand for the electricity of the vehicle.

The second embodiment provides the following advantages in addition to the advantages (1) to (7).

(8) The second embodiment further includes the flow control valve 50 for adjusting the flow rate of exhaust gas introduced into the scroll expansion device 20. Therefore, the scroll expansion device 20 is driven in accordance with the flow rate of exhaust gas from the engine 10 and the requirement for generating electricity. Thus, the exhaust energy is more efficiently recovered.

The second embodiment may be modified in the same manner as or in accordance with the modification of the first embodiment.

A third embodiment of the present invention will now be described. The differences from the first embodiment will mainly be discussed below.

Figure 5:
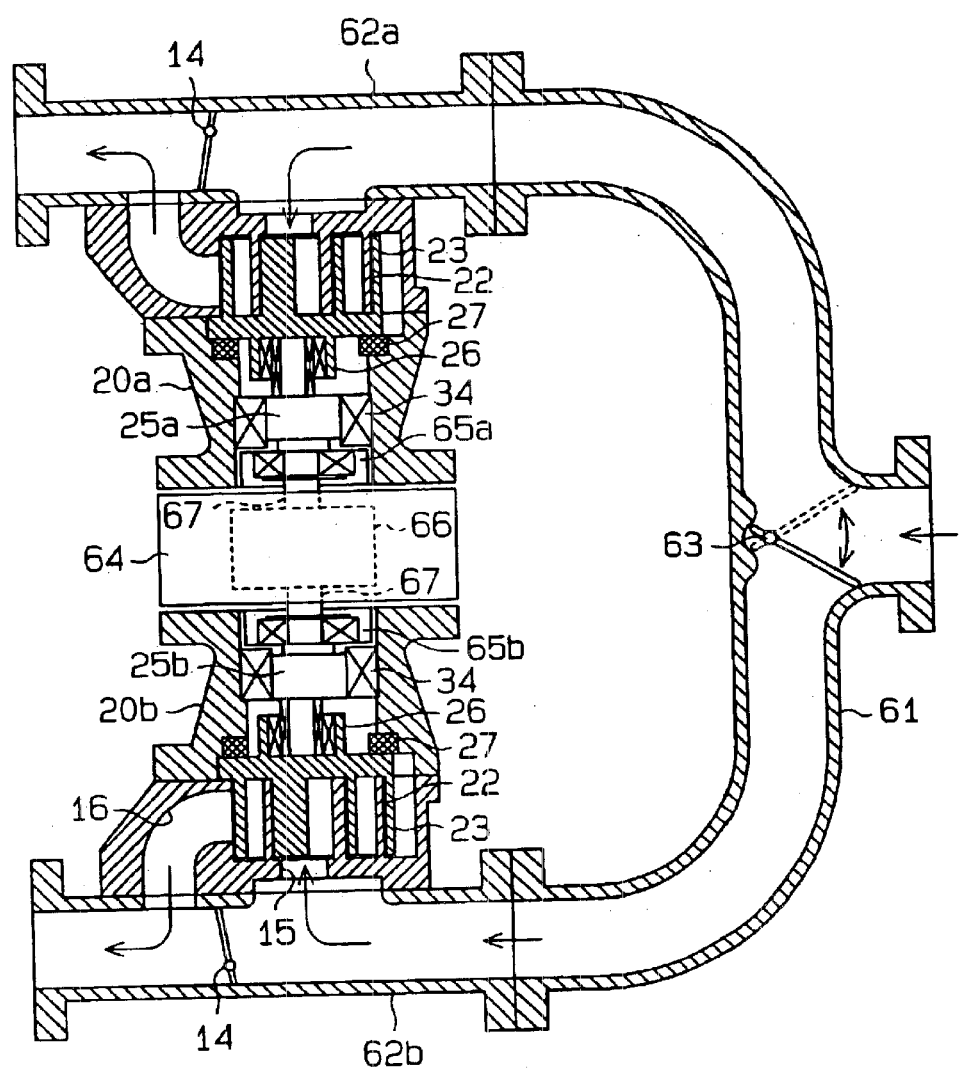
FIG. 5 is a cross-sectional view of a scroll expansion device and its vicinity according to a third embodiment.

As shown in FIG. 5, a branch pipe 61 is located at the outlet of a catalytic converter, which is not shown in FIG. 5. The branch pipe 61 includes passages 62a, 62b. A flow control valve 63, or a pressure-regulating valve, is located at the branching portion of the branch pipe 61 for adjusting the flow rate of exhaust gas to the passages 62a, 62b. Expansion devices 20a, 20b are provided for the passages 62a, 62b, respectively. The scroll expansion devices 20a, 20b have substantially the same structure as the scroll expansion device 20 shown in FIG. 2.

Mufflers may be located further downstream (not shown) of the passages 62a, 62b. If the scroll expansion devices 20a, 20b sufficiently eliminate the exhaust sound, the mufflers may be eliminated and the passages 62a, 62b may be open to the air. Also, the branched passages 62a, 62b may be integrated again at a portion downstream of the scroll expansion devices 20a, 20b.

In the second embodiment, the scroll expansion devices 20a, 20b are integrally assembled with a generator 64 located in between. The generator 64 includes a rotor 66 and a rotary shaft 67. The scroll expansion devices 20a, 20b have output shafts 25a, 25b, respectively. The output shafts 25a, 25b are coupled to the ends of the rotary shaft 67 of the rotor 66 by one-way clutches 65a, 65b, respectively. The rotor 66 of the generator 64 is supported by the scroll expansion devices 20a, 20b.

The one-way clutch 65a, 65b permits the rotor 66 of the generator 64 to rotate faster than the output shafts 25a, 25b of the scroll expansion devices 20a, 20b. The rotor 66 absorbs the difference in the rotational speed of the scroll expansion devices 20a, 20b.

When the flow rate of exhaust gas from the engine 10 is small, the flow control valve 63 controls the exhaust gas to flow through only one of the passages 62a, 62b. This maintains at least one of the scroll expansion devices 20a, 20b to be driven even when the flow rate of exhaust gas is small.

The third embodiment provides the following advantages in addition to the advantages (1) to (4).

(9) The output shafts 25a, 25b of the scroll expansion devices 20a, 20b are coupled to the ends of the rotary shaft 67 of the rotor 66 such that the rotor 66 is located between the scroll expansion devices 20a, 20b. Therefore, the rotor 66 is supported by the scroll expansion devices 20a, 20b on both ends. This structure allows the forces applied to the rotary shaft 67 of the rotor 66 in the thrust direction to eliminate each other so that the load on the scroll expansion devices 20a, 20b and the generator 64 is reduced. Also, the rotor 66 is supported in a stable manner.

(10) The scroll expansion devices 20a, 20b and the generator 64 are integrally assembled. Thus, the entire recovery system has high rigidity.

(11) The output shafts 25a, 25b of the scroll expansion devices 20a, 20b are coupled to the rotary shaft 67 of the rotor 66 by the one-way clutches 65a, 65b. Therefore, the difference in the rotational speed of the scroll expansion devices 20a, 20b is absorbed. Thus, even when the output of one of the scroll expansion devices 20a, 20b becomes lower than the other, the scroll expansion device 20a or 20b that has higher output drives the generator 64 without rotating the other scroll expansion device 20a or 20b that has lower output. Therefore, the electricity is generated more efficiently.

(12) When the flow rate of exhaust gas from the engine 10 is small, the flow control valve 63 allows exhaust gas to flow through only one of the passages 62a, 62b. Therefore, one of the scroll expansion devices 20a, 20b is kept driven even when the flow rate of exhaust gas is small.

The third embodiment may be modified as follows.

The one-way clutch 65a, 65b may be eliminated and the output shafts 25a, 25b of the scroll expansion devices 20a, 20b and the rotary shaft 67 of the generator 64 may be coupled to one another to rotate integrally.

When the output shafts 25a, 25b and the rotary shaft 67 are coupled to one another to integrally rotate, the exhaust sound from the scroll expansion devices 20a, 20b can further be reduced by applying the following structure. A movable scroll of each scroll expansion device 20a, 20b is mounted with different phases with respect to the rotary shaft 67 and an exhaust port of each scroll expansion device 20a, 20b is also located with different phases. Therefore, exhaust gas is exhausted from the scroll expansion devices 20a, 20b at different timings. For example, when the mounting phase of the movable scrolls and the phase of the exhaust ports are displaced by 180 degrees, exhaust gas is exhausted alternately from the scroll expansion devices 20a, 20b. Changing the exhausting timing of the scroll expansion devices 20a, 20b improves the sound eliminating performance.

The third embodiment may further be modified as follows.

In the third embodiment, the exhaust passage is branched into the passages 62a, 62b at a portion downstream of the catalytic converter. However, the exhaust passage may be branched at any position. Depending on the position of the branching portion, the exhaust efficiency of the combustion engine can further be improved.

Figure 6:
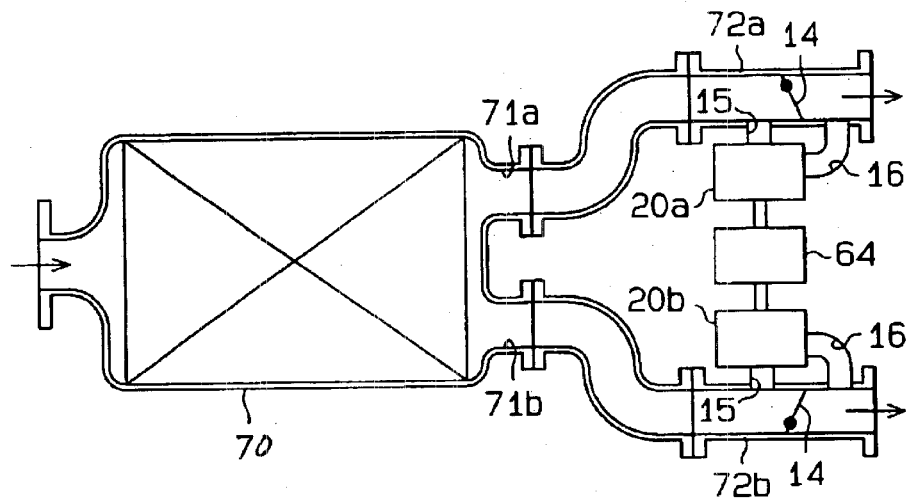
FIG. 6 is a schematic view illustrating the entire structure of a modified embodiment of the third embodiment.

In an example shown in FIG. 6, exhaust outlets 71a, 71b are formed on the catalytic converter 70. The scroll expansion devices 20a, 20b are located in passages 72a, 72b, respectively. The passages 72a, 72b are connected to the exhaust outlets 71a, 71b, respectively. In this case, the cross-sectional area of the exhaust outlet of the catalytic converter 70 is increased, which improves the flow of exhaust gas at the catalytic converter 70.

In an engine having several cylinders, exhaust efficiency of the combustion engine could deteriorate due to the exhaust interference with other cylinders. When arranging the exhaust energy recovery system having two scroll expansion devices as in the third embodiment in such engine and the exhaust passage is to be branched, the exhaust passages of the cylinders that are greatly affected by the exhaust interference with each other are preferably separated from the start.

Figure 7:
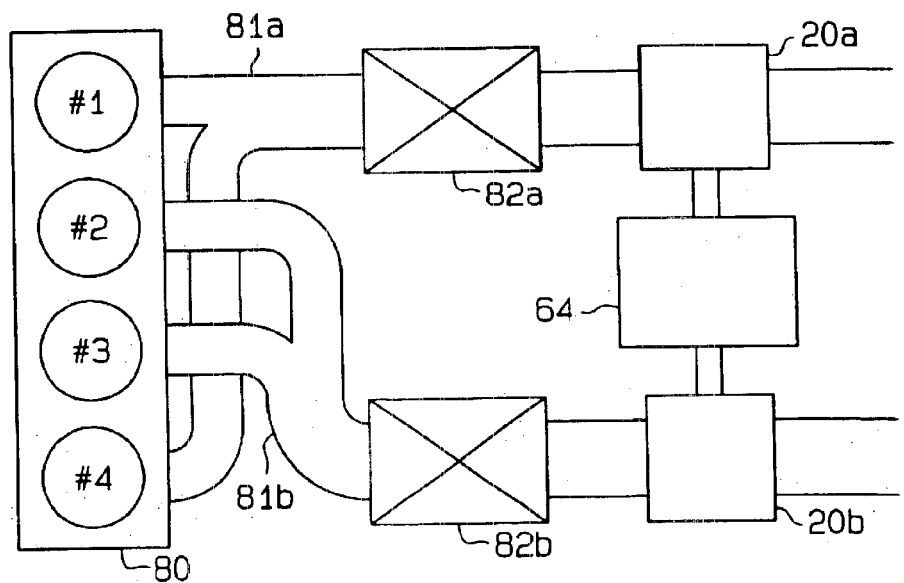
FIG. 7 is a schematic view illustrating the entire structure of another modified embodiment of the third embodiment.

FIG. 7 shows an exhaust energy recovery system applied to an engine 80 having four-cylinders. The engine 80 has first to fourth cylinders #1, #2, #3, and #4. Exhaust gas from the first and fourth cylinders #1, #4 is sent to the scroll expansion device 20a through an exhaust manifold 81a and a catalytic converter 82a. Exhaust gas from the second and third cylinders #2, #3 is sent to the scroll expansion device 20b through an exhaust manifold 81b and a catalytic converter 82b.

As described above, exhaust gas of each pair of the cylinders that have small exhaust interference with each other is sent to one of the scroll expansion devices 20a, 20b. This improves the exhaust efficiency of each cylinder #1, #2, #3, and #4 preventing exhaust interference.

In the exhaust energy recovery system having the scroll expansion device as described above, the scroll expansion device could cause problem such as exhaust gas leakage or clog of soot from the exhaust gas.

A fourth to eighth embodiments describe an additional structure of the scroll expansion device for solving such problems. The additional structures of the scroll expansion device according to the fourth to eighth embodiments may be applied to any of the scroll expansion devices of the exhaust energy recovery system according to first to third embodiments. The additional structures of the fourth to eighth embodiments may also be combined for application.

In the above embodiments, the expansion chambers and the crank chamber are defined in the scroll expansion device by the movable scroll. The expansion chambers are defined between the movable scroll and the fixed scroll. The crank chamber accommodates the crank mechanism and the output shaft and the like. However, exhaust gas can leak into the crank chamber from the expansion chambers through a clearance at the sliding portion between the movable scroll and the case. The following structure may be added to the scroll expansion device according to the above embodiments to reduce leakage of exhaust gas.

FIG. 8 shows a partial cross-sectional view of a scroll expansion device 90 having a modified sealing structure. The structure of the scroll expansion device 90 is the same as the above embodiments in that the scroll expansion device 90 includes a fixed scroll 91 and a movable scroll 92, and that exhaust gas introduced into the scroll expansion device 90 causes the movable scroll 92 to orbit.

In the scroll expansion device 90, a diaphragm 96 is located between the outer circumference of a base plate 92a of the movable scroll 92 and the inner circumference of a case 90a as shown in FIG. 8. The diaphragm 96 prevents exhaust gas from leaking into a crank chamber 93 from an expansion chamber P.

As shown in FIGS. 9(a) and 9(b), the diaphragm 96 is secured to an inner sleeve 94, which is fitted to the outer circumference of the base plate 92a of the movable scroll 92, and an outer sleeve 95, which is fitted to the inner circumference of the case 90a. The diaphragm 96 is flexible and permits the inner sleeve 94 to be displaced with respect to the outer sleeve 95 in the circumferential direction.

The diaphragm 96 is formed of annular metals having curved cross-sections as shown in FIG. 9(b). Therefore, while the diaphragm 96 flexibly deforms in the circumferential direction with respect to the orbital axis of the movable scroll 92, the rigidity in the axial direction is relatively high. This maintains the strength of the diaphragm 96 against the force applied in accordance with the pressure difference between the expansion chamber P and the crank chamber 93.

Further, the scroll expansion device 90 has a pressure equalizing mechanism for reducing the pressure difference between the expansion chamber P and the crank chamber 93. The mechanism includes a free piston 98 (movable member) located in a cylinder 97.

The cylinder 97 is communicated with the expansion chamber P and is communicated with a space S surrounded by the case 90a and the diaphragm 96 and the like. The free piston 98 is located in the cylinder 97 and slides with respect to the cylinder 97. The free piston 98 divides the inside of the cylinder 97 into a space communicated with the expansion chamber P and a space communicated with the space S. The free piston 98 is urged in a direction to reduce the space communicated with the expansion chamber P by a spring 99.

When the pressure in the expansion chamber P increases, the free piston 98 moves in a direction to reduce the space in the cylinder 97 communicated with the space S. Thus, air is sent to the space S from the cylinder 97. When the pressure in the expansion chamber P decreases, the free piston 98 moves in a direction to increase the space communicated with the space S. Thus, air in the space S is returned to the cylinder 97. Accordingly, the pressure in the space S is selectively increased and decreased in accordance with the increase and decrease of the pressure in the expansion chamber P. This reduces the pressure difference between the expansion chamber P and the space S, which decreases leakage of exhaust gas from the expansion chamber P to the crank chamber 93. When the pressure difference is reduced, the force applied to the diaphragm 96 in accordance with the pressure difference is also reduced. This prevents the diaphragm 96 from the rapid pressure fluctuation in the expansion chamber P.

Either one of the sealing structure using the diaphragm 96 or the equalization mechanism using the free piston 98 may be applied to the scroll expansion device 90. In this case also, exhaust gas is prevented from entering the crank chamber 93 from the expansion chamber P.

Leakage of exhaust gas to the crank chamber 93 from the expansion chamber P may be reduced by adding the following structure.

Figure 10:
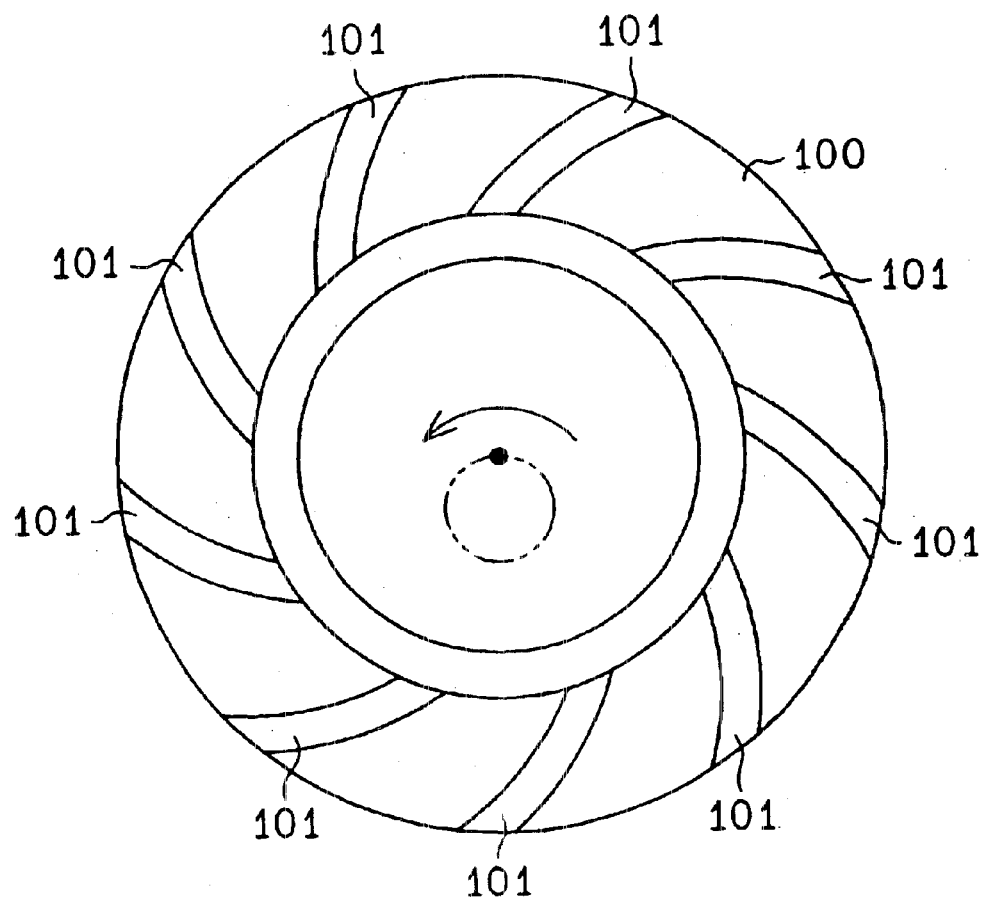
FIG. 10 is a plan view illustrating the rear surface of a movable scroll according to a fifth embodiment.

In the fifth embodiment, grooves 101 are formed on the rear surface of a base plate 100 of a movable scroll, or on the surface opposite to the surface to which the volute portion is secured, as shown in FIG. 10. The grooves 101 function as a centrifugal fan for sending air to the outer circumference of the movable scroll as the movable scroll orbits. The air sent by the centrifugal fan increases the pressure of the crank chamber side at a portion between the outer circumference of the base plate 100 and the case. This reduces leakage of exhaust gas from the expansion chambers to the crank chamber.

Instead of grooves 101, blades may be attached to the rear surface of the base plate 100 of the movable scroll. In this case also, the movable scroll functions as a centrifugal fan.

As described above, the scroll expansion device generates power by orbiting the movable scroll with exhaust gas introduced into expansion chambers, which are defined by the volute portions of the fixed scroll and the movable scroll and the base plate. However, exhaust gas can leak into other expansion chambers through a clearance between the sliding face of the distal end of each volute portion and the corresponding base plate.

Therefore, the scroll expansion device according a sixth embodiment is provided with the following structure in addition to the above embodiments to reduce leakage of exhaust gas between expansion chambers.

Figure 11:
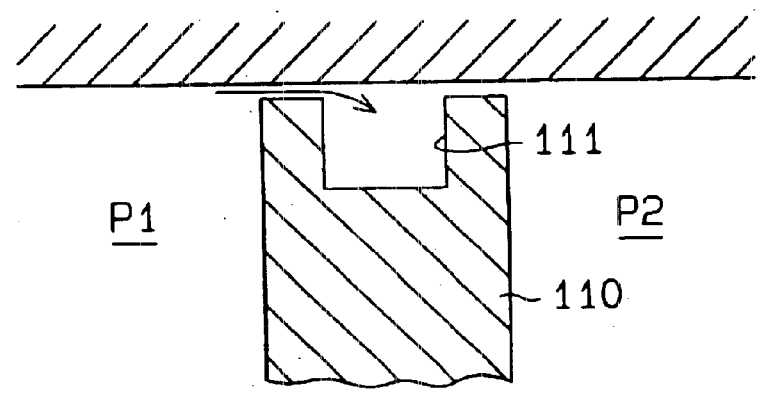
FIG. 11 is an enlarged partial cross-sectional view illustrating the distal end of a volute portion having a labyrinth groove.

If a labyrinth groove 111 is formed on the distal end of a volute portion 110 extending in the circumferential direction as shown in FIG. 11, exhaust gas that has entered the clearance at the distal end of the volute portion 110 enters the labyrinth groove 111. When exhaust gas enters the labyrinth groove 111, the pressure of the exhaust gas decreases. This prevents exhaust gas from flowing between the expansion chambers P1, P2. However, in this case, the exhaust gas that has entered the labyrinth groove 111 flows out along the volute portion after passing through the labyrinth groove 111. Therefore, leakage of exhaust gas from the expansion chamber is not reduced sufficiently.

Figure 12:
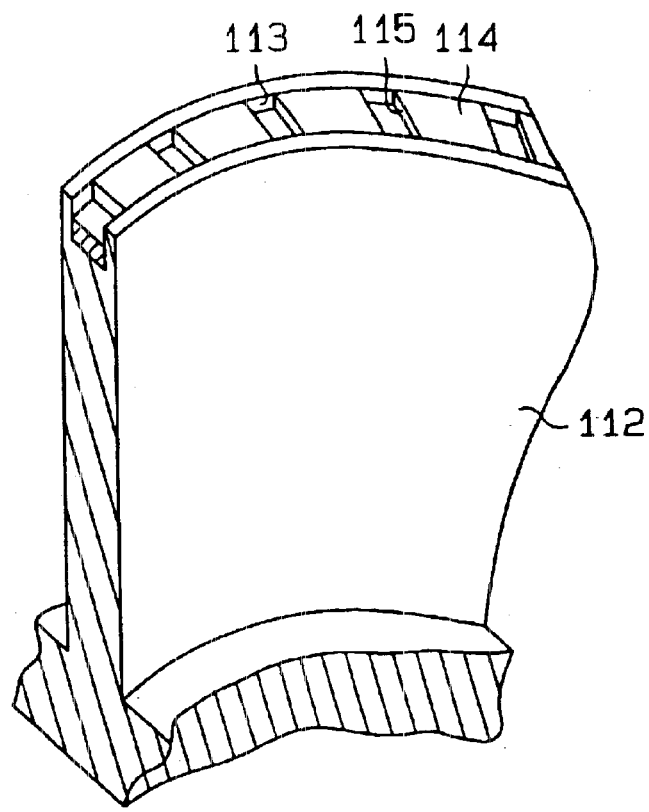
FIG. 12 is a partial perspective view of a part of a volute portion to which a sealing structure according to a sixth embodiment is provided.
Figure 13A:
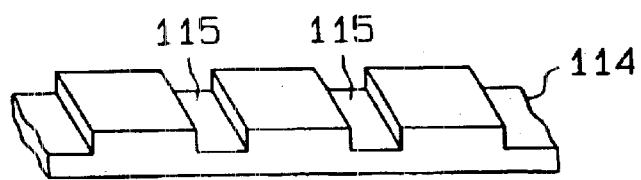
FIGS. 13(a), 13(b), and 13(c) are partial perspective views of dividing members arranged on the volute portion.

A groove 113 is formed on the distal end of a volute portion 112 extending in the circumferential direction as shown in FIG. 12. A dividing member 114 shown in FIG. 13(a) is fitted in the groove 113. The cross-section of the dividing member 114 is substantially the same as the groove 113 and recesses 115 are formed at predetermined intervals in the circumferential direction. By fitting the dividing member 114, the labyrinth groove on the distal end of the volute portion 110 is divided at predetermined intervals in the circumferential direction. This suppresses leakage of exhaust gas through the labyrinth groove and the sealing of the expansion chambers of the scroll expansion device is sufficiently maintained.

Figure 13B:
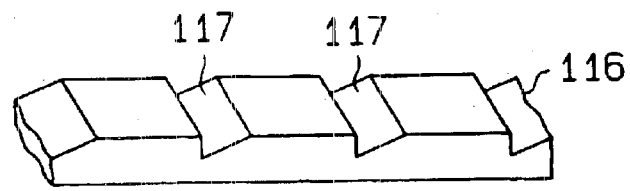

The recesses of the dividing member 114 may be modified to the shape shown in FIG. 13(b) to further reduce the flow of exhaust gas in the circumferential direction through the labyrinth.

Figure 13C:
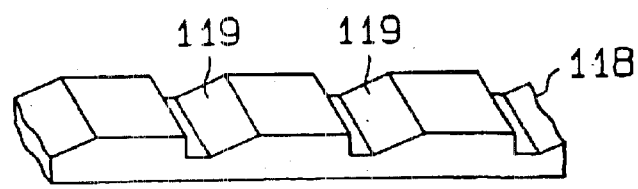
Figure 14:
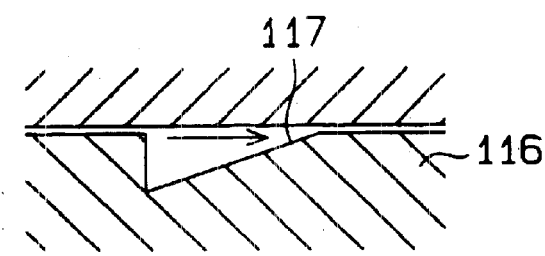
FIG. 14 is a partial cross-sectional view illustrating the distal end of the volute portion.

A dividing member 116 shown in FIG. 13(b) includes recesses 117 formed at predetermined intervals in the circumferential direction. The cross-section of the recesses 117 in the circumferential direction is triangular as shown in FIG. 14. The pressure of exhaust gas that has entered the recesses 117 increases as the exhaust gas flows in the direction shown by an arrow in FIG. 14. Thus, leakage of exhaust gas through the labyrinth groove in the direction shown by the arrow is effectively reduced. A dividing member 118 having grooves 119 as shown in FIG. 13(c) also provides the same advantage as the dividing member 116 shown in FIG. 13(b).

The labyrinth groove, which is divided in the circumferential direction as described above, may be directly formed on the distal end of the volute portion. The labyrinth groove can be formed on the distal end of the volute portion relatively easily if the volute portion and the base plate are separately formed.

Furthermore, leakage of exhaust gas from the expansion chambers is reduced by adding the following structure.

During the operation of the scroll expansion device, the height of the volute portions of the movable scroll and the fixed scroll vary due to thermal expansion caused by the heat of exhaust gas. The movable scroll is difficult to be cooled down from the exterior and tends to become hotter than the fixed scroll. Therefore, if the movable scroll and the fixed scroll are formed of the same material, difference in the level of thermal expansion due to temperature difference causes difference in the height of the volute portions of the scrolls. Accordingly, the clearance between the distal end of each volute portion and the corresponding base plate increases, which increases leakage of exhaust gas from the expansion chambers.

The increase of clearance is reduced in a suitable manner by making the movable scroll out of material having smaller coefficient of thermal expansion than the fixed scroll. For example, if the movable scroll is made of cast-iron or stainless steel, the fixed scroll is made of aluminum alloy.

In the scroll expansion device employed in the exhaust energy recovery system, soot of exhaust gas adheres to parts (such as the distal end of volute portions) and can hinder the operation of the scroll expansion device. In the eighth embodiment, outside air is introduced into the scroll expansion device such that the flow of air removes the adhered soot.

Figure 15:
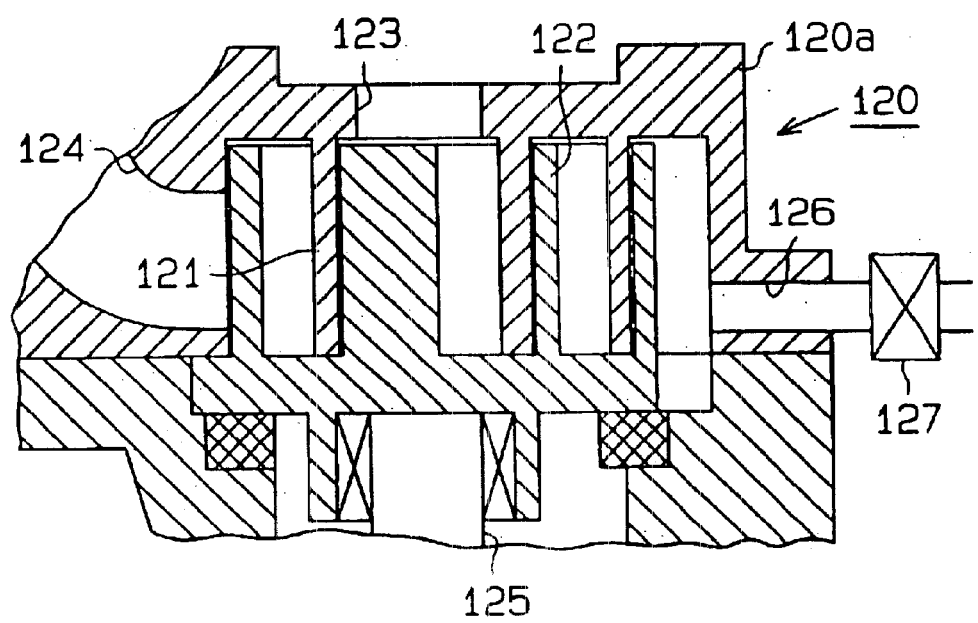
FIG. 15 is an enlarged partial cross-sectional view illustrating a scroll expansion device according to a seventh embodiment.

In the seventh embodiment FIG. 15 shows an example of a scroll expansion device 120, which permits the outside air to be introduced. The scroll expansion device 120 has the same structure as the above embodiments in that the scroll expansion device 120 has a fixed scroll 121 and a movable scroll 122, and that the movable scroll 122 orbits by the flow of exhaust gas introduced into the scroll expansion device 120 through a suction port 123 and exhausted from an exhaust port 124.

The scroll expansion device 120 according to the seventh embodiment further includes an introduction passage 126. The introduction passage 126 is connected to a case 120a and is open to the outside air via a check valve 127. The introduction passage 126 is communicated with the outermost expansion chamber defined by the fixed scroll 121 and the movable scroll 122. The check valve 127 is a closed-type pressure-regulating valve, which opens when the pressure in the expansion chamber is lower than the atmospheric pressure to draw in the outside air into the expansion chamber.

The pressure in the exhaust passage (exhaust pressure) temporarily becomes lower than the outside air due to pulsation. When the exhaust pressure is lower than the atmospheric pressure, the check valve 127 opens and permits the outside air into the expansion chamber. The introduced air removes soot adhered to the scroll expansion device 120.

Introducing the outside air into the scroll expansion device 120 allows to remove soot adhered inside the scroll expansion device 120. The outside air may be forced into the scroll expansion device 120 by a blower or the like.

Furthermore, the following modification allows to remove soot adhered inside the scroll expansion device.

The generator coupled to the scroll expansion device may be temporarily used as an electric motor to force the scroll expansion device to rotate, thereby removing adhered soot. For example, the scroll expansion device may be rotated in the reverse direction to generate flow of exhaust gas in the reverse direction. This removes the adhered soot in a suitable manner.

Also, catalyst that promotes combustion of soot may be arranged on the distal end of the volute portions where soot tends to adhere. The catalyst burns the adhered soot using excessive oxygen in exhaust gas.

Above mentioned additional structures solve problems such as exhaust gas leakage or clog of soot from the exhaust gas.

An eighth embodiment of the present invention will now be described with reference to FIGS. 16 and 17. Differences from the above embodiments are mainly described. In the eighth embodiment, a supporting structure of the movable scroll and coupling structure of the movable scroll with the generator are modified.

Figure 16:
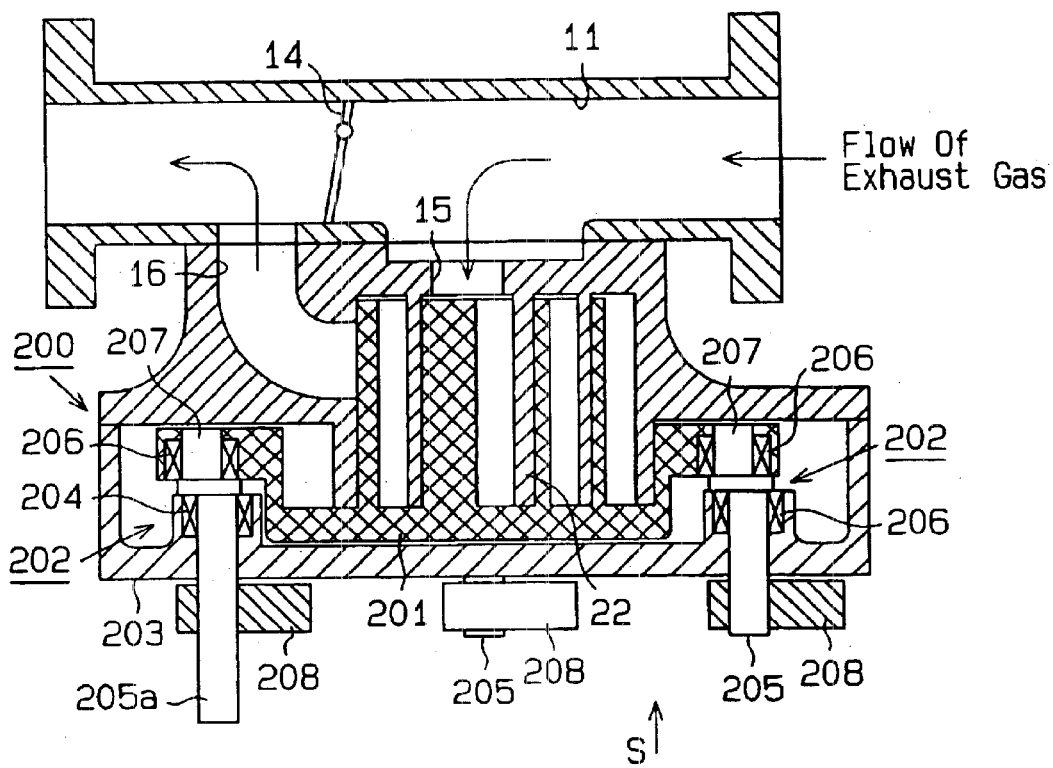
FIG. 16 is a cross-sectional view illustrating a scroll expansion device and its vicinity according to an eighth embodiment.
Figure 17:
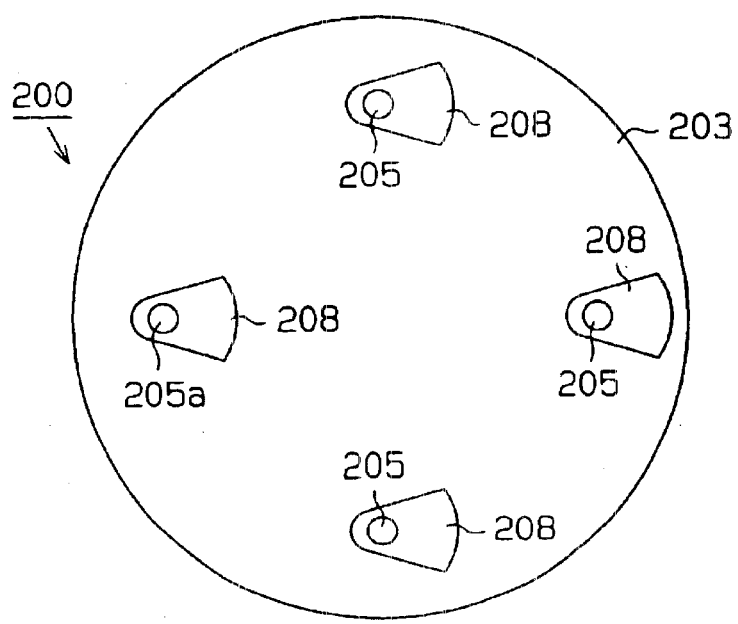
FIG. 17 is a plan view illustrating the scroll expansion device according to the eighth embodiment.

FIG. 16 shows a cross-sectional side view of a scroll expansion device 200 and FIG. 17 shows a plan view of the scroll expansion device 200 as viewed from the side indicated by an arrow S in FIG. 16.

A movable scroll 201 of the scroll expansion device 200 is supported by a case 203 with crank mechanisms 202 (two in this embodiment). Each crank mechanism 202 includes a support shaft 205 or 205a and an eccentric shaft 207. Each support shaft 205 or 205a is rotatably supported by a case 203 with a bearing 204. Each eccentric shaft 207 is coupled to the corresponding support shaft 205 or 205a offset from the corresponding axis and is rotatably supported at the outer circumferential portion of the movable scroll 201 with a bearing 206. The crank mechanisms 202 prevent rotation of the movable scroll 201 while permitting the movable scroll 201 to orbit.

Each support shaft 205, 205a has a counterweight 208 to prevent the center of gravity from moving in accordance with the orbital movement of the movable scroll 201.

In the scroll expansion device 200, the support shaft 205a is an output shaft and is operably coupled to the drive shaft of the generator.

In the scroll expansion device 200, the movable scroll 201 is supported by crank mechanisms 202. Therefore, the load on each crank mechanism 202 is small. Thus, the sizes of the support shafts 205, 205a, the eccentric shaft 207, and the bearings 204, 206 are minimized. As a result, the size and thickness of the entire scroll expansion device 200 are minimized. The reduction in size decreases the thermal capacity, which facilitates cooling of the bearings 204, 206. Further, the weight of the rotary parts is reduced and the scroll expansion device 200 is rotated faster.

The scroll expansion device 200 may be applied to the scroll expansion device of the exhaust energy recovery system according to the first to third embodiments. The structures according to the fourth to eighth embodiments may also be added to the scroll expansion device 200.

Therefore, the present examples and embodiments are to be considered as illustrative and not restrictive and the invention is not to be limited to the details given herein, but may be modified within the scope and equivalence of the appended claims.

What is claimed is:

1. An exhaust energy recovery system for a combustion engine having an exhaust passage, the exhaust energy recovery system comprising:

a displacement expansion device located in the exhaust passage, wherein the exhaust gas is introduced into the expansion device, the expansion device has an expansion chamber, and the volume of the expansion chamber varies in accordance with the pressure of the exhaust gas and generates power in accordance with the volume variation of the expansion chamber;

a generator for generating electricity in accordance with the power generated by the expansion device; and a catalytic converter located in the exhaust passage, the expansion device being located downstream of the catalytic converter in the exhaust passage.

2. The exhaust energy recovery system according to claim 1, wherein the expansion device is scroll type.

3. The exhaust energy recovery system according to claim 1, wherein the expansion device serves as a muffler to reduce exhaust sound.

4. The exhaust energy recovery system according to claim 1, further comprising a relief valve, wherein, when the pressure in the exhaust passage is greater than or equal to a predetermined value, the relief valve permits exhaust gas to flow without going through the expansion device.

5. The exhaust energy recovery system according to claim 1, further comprising a pressure-regulating valve for regulating the flow rate of exhaust gas introduced into the expansion device.

6. The exhaust energy recovery system according to claim 1, wherein the exhaust passage includes a first branch and a second branch, wherein the first branch permits exhaust gas to flow via the expansion device, and the second branch permits exhaust gas to flow without going through the expansion device, and wherein a muffler for reducing exhaust sound is located in the second branch only 7. The exhaust energy recovery system according to claim 1, wherein the expansion device is one of two expansion devices, and wherein a rotor of the generator and the expansion devices are coupled serially such that the rotor is located between the expansion devices.

8. The exhaust energy recovery system according to claim 7, wherein the timing of each expansion device at which exhaust gas is exhausted differs from each other.

9. The exhaust energy recovery system according to claim 7, wherein the combustion engine is an engine having several cylinders, and exhaust gas of cylinders that have small exhaust interference with each other is sent to each expansion device.

10. The exhaust energy recovery system according to claim 1, wherein the generator is driven as an electric motor to forcibly drive the expansion device during a predetermined period.

11. The exhaust energy recovery system according to claim 1, wherein the expansion device includes a space communicated with the expansion chamber and a movable member, which moves in accordance with the pressure in the expansion chamber, wherein, when the pressure in the expansion chamber is greater than or equal to a predetermined value, the movable member moves in a direction to reduce the space.

12. The exhaust energy recovery system according to claim 1, wherein the expansion device includes a movable scroll having a base plate, and a groove is radially formed on the base plate about the axis of the base plate.

13. The exhaust energy recovery system according to claim 1, wherein the expansion device includes a movable scroll, and the movable scroll has a base plate and volute portion, which is formed on the base plate, wherein the volute portion has a proximal end portion and a distal end portion with respect to the base plate, and a groove is formed on the distal end.

14. The exhaust energy recovery system according to claim 13, wherein the groove is one of a plurality of grooves.

15. An exhaust energy recovery system for a combustion engine having an exhaust passage, the exhaust energy recovery system comprising:

a scroll type expansion device located in the exhaust passage, wherein the exhaust gas is introduced into the scroll type expansion device, the scroll type expansion device has an expansion chamber, and the volume of the expansion chamber varies in accordance with the pressure of the exhaust gas and generates power in accordance with the volume variation of the expansion chamber;

a generator for generating electricity in accordance with the power generated by the the scroll type expansion device; and a relief valve for permitting flow of exhaust gas when the pressure in the exhaust passage is greater than or equal to a predetermined value; and a catalytic converter located in the exhaust passage, the scroll type expansion device being located downstream of the catalytic converter in the exhaust passage, wherein the expansion device includes a space comuunicated with the expansion chamber, wherein, when the pressure in the expansion chamber is greater than or equal to a predetermined value, the movable member moves in a direction to reduce the space.

* * * * *

UNITED STATES PATENT AND TRADEMARK OFFICE
CERTIFICATE OF CORRECTION

PATENT NO. : 7,104,060 B2 Page 1 of 1
APPLICATION NO. : 10/279859
DATED : September 12, 2006
INVENTOR(S) : Masahiro Ogawa et al.

It is certified that error appears in the above-identified patent and that said Letters Patent is hereby corrected as shown below:

In the Title Page, col. 2, line 1: Change "6,511,308 B1" to --6,511,308 B2--.

In the fourth line after "OTHER PUBLICATIONS", change "English Tanslation" To --English Translation--.

| Column | Line | |
|---|---|---|
| 13 | 5 | After "exhaust passage" insert --; and an introduction passage for introducing outside air into the expansion device--. |
| 13 | 26 | After "only" insert --,--. |
| 14 | 40 | Change "comuuni-" to --communi- --. |
| 14 | 41 | After "chamber" insert --and a movable member, which moves in accordance with the pressure in the expansion chamber--. |

Signed and Sealed this

Second Day of January, 2007

JON W. DUDAS
*Director of the United States Patent and Trademark Office*